April 13, 1926.
O. H. JOHNSON
AUTOMATIC WATER SUPPLY FOR WET BATTERIES
Filed Nov. 12, 1924
1,580,493
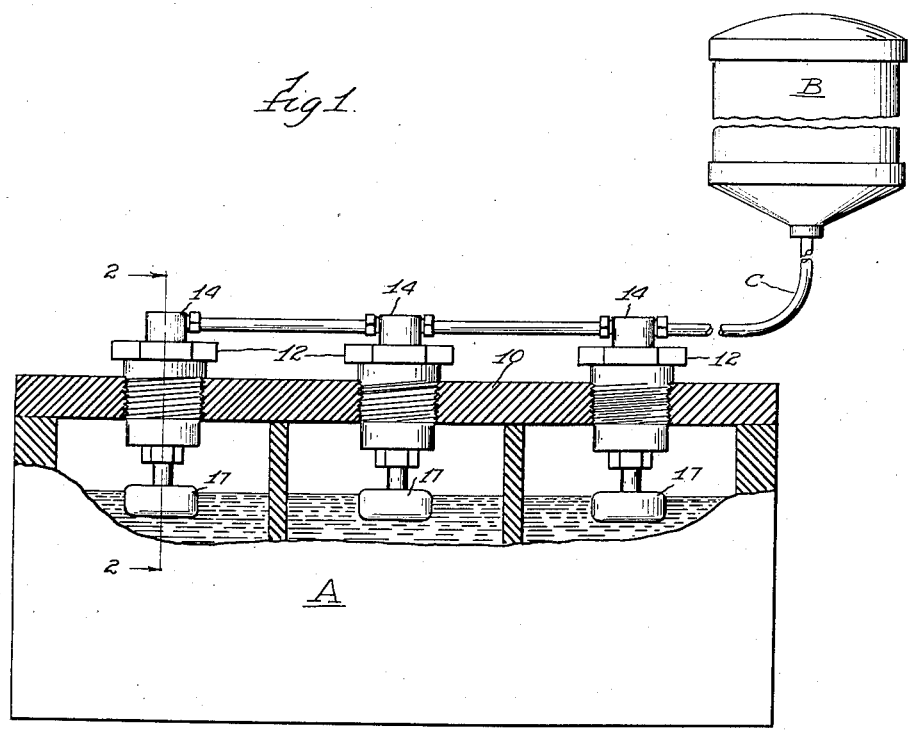
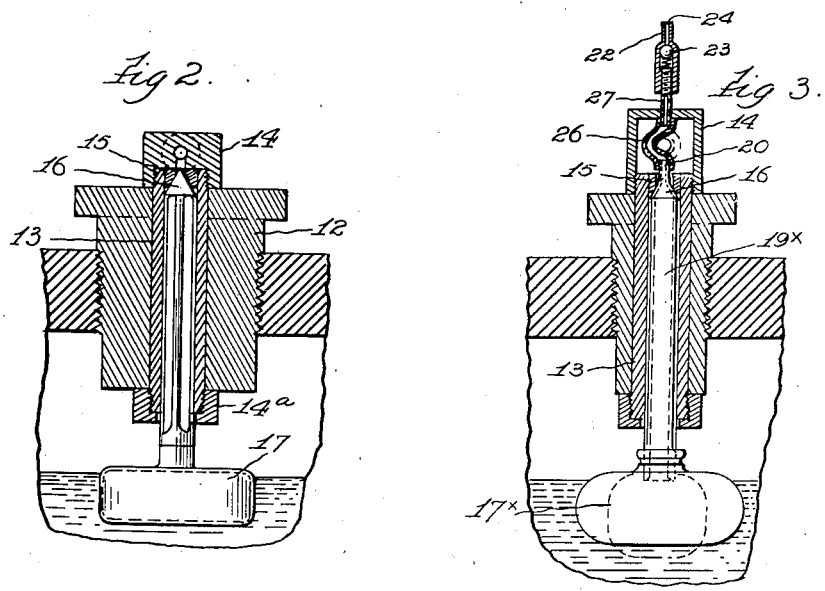
Witness
N T McKnight
Inventor.
Oscar H. Johnson.
by Burton & Burton
his Attorneys.

Patented Apr. 13, 1926.

1,580,493

UNITED STATES PATENT OFFICE.

OSCAR H. JOHNSON, OF CHICAGO, ILLINOIS.

AUTOMATIC WATER SUPPLY FOR WET BATTERIES.

Application filed November 12, 1924. Serial No. 749,399.

*To all whom it may concern:*

Be it known that I, OSCAR H. JOHNSON, a citizen of the United States, and a resident of the city of Chicago, in the county of Cook and the State of Illinois, have invented certain new and useful Improvements in Automatic Water Supplies for Wet Batteries, of which the following is a specification, reference being had to the accompanying drawings, forming a part thereof.

The purpose of this invention is to provide means for affording automatic water supply for maintaining in operative condition the several cells of a wet battery on an automobile or any like situation. It consists in the elements and features of construction shown and described as indicated in the claims.

In the drawings:

Figure 1 is a partly sectional side elevation of a wet battery equipped with automatic water supplying means embodying this invention, section being made vertical at the upper part of the battery through the water space of the several cells at the line in which the several water supply connections are mounted.

Figure 2 is a detail section at the line, 2—2, on Figure 1.

Figure 3 is a view similar to Figure 2, showing a detail modification for employing an inflatable float and thereby diminishing the size of the aperture in the battery casing cover for the water connection.

In the drawings, A is a conventional representation of a wet battery comprising three cells. B is an elevated water supply reservoir connected for maintaining the water supply in the battery cells. For accomplishing the purpose of the invention the cover plate, 10, of the battery casing has over each cell a threaded aperture for receiving a fitting through which water may be discharged into the cell. As illustrated, this fitting comprises a plug, 12, screwed into the aperture of the battery casing cover, and having mounted in it and extending through it a pipe member, 13, which is held fixedly in the plug by means of an interiorly flanged nut at the lower end, and the pipe fitting (angle or T), 14, at the upper end. From the reservoir, B, the discharge conduit, C, is extended along the upper side of the battery casing and is connected by suitable couplings to the fittings, 14, for delivery of water through said fittings to the several battery cells. Into the upper end of each of the pipe members, 13, there is inserted a valve seat, 15, for seating at its lower side a valve, 16, whose stem extends down through the pipe member, 13, and at the lower end thereof carries a float, 17, which at a predetermined high level of the water in the cell upholds the valve to seated position as seen in Figure 2; and upon the water level falling below said predetermined high level, withdraws the valve, 16, from its seat, or permits it to drop by gravity, to open the port which it controls for admission of water under gravity flow from the reservoir, B, to the cell. It will be understood that each of the cells, independently of the others, is at all times in free communication with the reservoir, B, subject to the control of the valve operated by the float in the particular cell, regardless of the level of the water in any other cell.

As shown in Figures 1 and 2 the diameter of the float is such that it may be introduced through the aperture in the battery cover into which the plug, 12, is screwed. This necessitates a comparatively large aperture and plug, or a float smaller than desirable. To avoid this objection the construction shown in Figure 3 may be employed, consisting in making the stem $19^x$, of the valve, 16, hollow and extending said stem reduced in diameter, as seen at 20, up through the port which the valve controls, and the float is in the form of an inflatable bag as indicated at $17^x$ in Figure 3. The upper end of the hollow stem is connected by a flexible tube, 26, with a hollow nipple, 27, with which the fitting, 14, is provided, and means for inflating the float is provided at the outer end of said nipple, which may be of the familiar type shown, comprising a nozzle, 22, screwed onto the end of the hollow stem, 27, with a ball check valve, 23, spring-pressed for closing the inlet duct, 24, adapted to yield when an inflating pump or the like is attached to the nozzle and operated for inflating the float, and seating when the pump is withdrawn for retaining the air by which the float is inflated.

I claim:—

1. In combination with a wet battery and water supplying means therefor consisting of an elevated water supply reservoir, a conduit leading therefrom, a pipe member mounted in the battery casing connected at its outer end with the conduit and at its inner end open for liquid communication with the water space of the battery casing, a hollow-stemmed valve extending out through the upper end of the pipe member; a fitting for connecting the pipe member with the conduit having a hollow nipple projecting into the cavity of said fitting, a float operatively connected with said valve stem for seating the valve against flow into the water space of the battery at a predetermined high level of water therein, the float being an inflatable and collapsible bag secured for communication of its cavity with the cavity of the valve stem below the valve thereon, and means at the outer end of said nipple for connection therewith of means for inflating the collapsible float through the valve stem.

2. In combination with a wet battery an automatic water supplying means therefore consisting of an elevated water supply reservoir; a conduit leading therefrom, a pipe member mounted in the battery casing connected at its outer end with the conduit and at its inner end open for liquid communication with the water space of the battery casing; a valve controlling communication of the conduit with said pipe member and a float operatively connected with the valve for seating the same against flow into the water space of the battery at a predetermined high level of water therein, the valve having a hollow stem whose cavity is connected with the cavity of the float, and the float being an inflatable bag, whereby the same may be inflated through the stem.

In testimony whereof, I have hereunto set my hand at Chicago, Illinois, this 10th day of November, 1924.

OSCAR H. JOHNSON.